(12) United States Patent
Guérin et al.

(10) Patent No.: US 6,780,939 B2
(45) Date of Patent: Aug. 24, 2004

(54) LOW MOLECULAR WEIGHT HYDROGENATED NITRILE RUBBER

(75) Inventors: Frédéric Guérin, Petrolia (CA); Sharon X. Guo, Stratford (CA); Zsolt Szentivanyi, Leverkusen (DE); Stephan Glander, Sarnia (CA)

(73) Assignee: Bayer Inc., Sarnia (CA)

( * ) Notice: Subject to any disclaimer, the term of this patent is extended or adjusted under 35 U.S.C. 154(b) by 25 days.

(21) Appl. No.: 10/167,289

(22) Filed: Jun. 10, 2002

(65) Prior Publication Data

US 2003/0088035 A1 May 8, 2003

(30) Foreign Application Priority Data

Jun. 12, 2001 (CA) ............................................ 2350280

(51) Int. Cl.⁷ ................................................ C08F 20/44
(52) U.S. Cl. ................... 525/329.1; 525/338; 425/28.1; 138/118; 277/301; 277/306; 277/312; 277/322
(58) Field of Search ............................. 525/329.1, 338; 425/28.1; 138/118; 277/301, 306, 312, 322

(56) References Cited

U.S. PATENT DOCUMENTS 5,208,296 A * 5/1993 Rempel et al. ............. 525/338
5,446,102 A 8/1995 Oziomek et al. ........... 525/245

FOREIGN PATENT DOCUMENTS

| EP | 0588096 B1 | * | 1/1996 |
| EP | 0588099 B1 | * | 1/1996 |
| EP | 0588098 B1 | * | 1/1997 |

* cited by examiner

Primary Examiner—William Cheung
(74) Attorney, Agent, or Firm—Joseph C. Gil; Jennifer R. Seng

(57) ABSTRACT

The present invention relates to hydrogenated nitrile rubber polymers having lower molecular weights and narrower molecular weight distributions than those known in the art. The present invention is also related to shaped articles containing hydrogenated nitrile rubber polymers having lower molecular weights and narrower molecular weight distributions than those known in the art.

2 Claims, 1 Drawing Sheet

LOW MOLECULAR WEIGHT HYDROGENATED NITRILE RUBBER

FIELD OF THE INVENTION

The present invention relates to hydrogenated nitrile rubber polymers having lower molecular weights and narrower molecular weight distributions than those known in the art.

BACKGROUND OF THE INVENTION

Hydrogenated nitrile rubber (HNBR), prepared by the selective hydrogenation of acrylonitrile-butadiene rubber (nitrile rubber; NBR, a co-polymer comprising at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (in particular the high resistance to abrasion) it is not surprising that HNBR has found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney Viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer. In addition, these types of approaches, by their very nature, produce polymers having a broad molecular weight distribution.

A hydrogenated nitrile rubber having a low Mooney (<55) and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4@100° C.) and a RDB of 18%.

Figure 1:
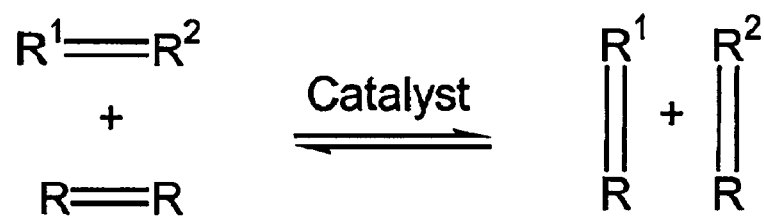

Karl Ziegler's discovery of the high effectiveness of certain metal salts, in combination with main group alkylating agents, to promote olefin polymerization under mild conditions has had a significant impact on chemical research and production to date. It was discovered early on that some "Ziegler-type" catalysts not only promote the proposed coordination-insertion mechanism but also effect an entirely different chemical process, that is the mutual exchange (or metathesis) reaction of alkenes according to a scheme as shown in FIG. 1.

Acyclic diene metathesis (or ADMET) is catalyzed by a great variety of transition metal complexes as well as non-metallic systems. Heterogeneous catalyst systems based on metal oxides; sulfides or metal salts were originally used for the metathesis of olefins. However, the limited stability (especially towards hetero-substituents) and the lack of selectivity resulting from the numerous active sites and side reactions are major drawbacks of the heterogeneous systems.

Homogeneous systems have also been devised and used to effect olefin metathesis. These systems offer significant activity and control advantages over the heterogeneous catalyst systems. For example, certain Rhodium based complexes are effective catalysts for the metathesis of electron-rich olefins.

The discovery that certain metal-alkylidene complexes are capable of catalyzing the metathesis of olefins triggered the development of a new generation of well-defined, highly active, single-site catalysts. Amongst these, Bis-(tricyclohexylphosphine)-benzylidene ruthenium dichloride (commonly know as Grubb's catalyst) has been widely used, due to its remarkable insensitivity to air and moisture and high tolerance towards various functional groups. Unlike the molybdenum-based metathesis catalysts, this ruthenium carbene catalyst is stable to acids, alcohols, aldehydes and quaternary amine salts and can be used in a variety of solvents ($C_6H_6$, $CH_2Cl_2$, THF, t-BuOH).

The use of transition-metal catalyzed alkene metathesis has since enjoyed increasing attention as a synthetic method. The most commonly used catalysts are based on Mo, W and Ru. Research efforts have been mainly focused on the synthesis of small molecules, but the application of olefin metathesis to polymer synthesis has allowed the preparation of new polymeric material with unprecedented properties (such as highly stereoregular poly-norbornadiene).

Figure 2:
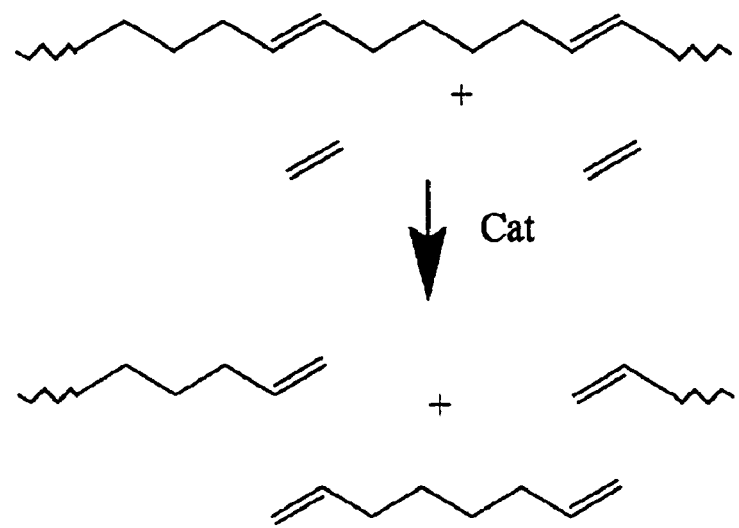

The utilization of olefin metathesis as a means to produce low molecular weight compounds from unsaturated elastomers has received growing interest. The principle for the molecular weight reduction of unsaturated polymers is shown in FIG. 2. The use of an appropriate catalyst allows the cross-metathesis of the unsaturation of the polymer with the co-olefin. The end result is the cleavage of the polymer chain at the unsaturation sites and the generation of polymer fragments having lower molecular weights. In addition, another effect of this process is the "homogenizing" of the polymer chain lengths, resulting in a reduction of the polydispersity. From an application and processing stand point, a narrow molecular weight distribution of the raw polymer results in improved physical properties of the vulcanized rubber, whilst the lower molecular weight provides good processing behavior.

The so-called "depolymerization" of copolymers of 1,3-butadiene with a variety of co-monomers (styrene, propene, divinylbenzene and ethylvinylbenzene, acrylonitrile, vinyltrimethylsilane and divinyldimethylsilane) in the presence of classical Mo and W catalyst system has been investigated. Similarly, the degradation of a nitrile rubber using $WCl_6$ and $SnMe_4$ or PhC≡CH co-catalyst was reported in 1988. However, the focus of such research was to produce only low molecular fragments, which could be characterized by conventional chemical means and contains no teaching with respect to the preparation of low molecular weight nitrile rubber polymers. Furthermore, such processes are non-controlled and produce a wide range of products.

The catalytic depolymerization of 1,4-polybutadiene in the presence of substituted olefins or ethylene (as chain transfer agents) in the presence of well-defined Grubb's or Schrock's catalysts is also possible. The use of Molybdenum or Tungsten compounds of the general structural formula {M(=NR1)(OR2)2(=CHR); M=Mo, W} to produce low molecular weight polymers or oligomers from gelled polymers containing internal unsaturation along the polymer backbone was claimed in U.S. Pat. No. 5,446,102. Again, however, the process disclosed is non-controlled, and there is no teaching with respect to the preparation of low molecular weight nitrile rubber polymers.

SUMMARY OF THE INVENTION

We have now discovered that hydrogenated nitrile rubber having lower molecular weights and narrower molecular weight distributions than those known in the art can be prepared by the olefin metathesis of nitrile butadiene rubber, followed by hydrogenation of the resulting metathesized NBR.

Thus, the present invention is directed to a hydrogenated nitrile rubber having a molecular weight (MW) in the range of from 30,000 to 250,000 g/mol, a Mooney viscosity (ML 1+4@100 deg. C.) in the range of from 3 to 50, and a MWD (or polydispersity index) of less than 2.5.

The present invention is also directed to the use of low molecular weight hydrogenated nitrile rubber for the manufacture of a shaped article, such as a seal, hose, bearing pad, stator, well head seal, valve plate, cable sheathing, wheel, roller, pipe seal or footwear component.

DETAILED DESCRIPTION OF THE INVENTION

As used throughout this specification, the term "nitrile polymer" is intended to have a broad meaning and is meant to encompass a copolymer having repeating units derived from at least one conjugated diene, at least one α,β-unsaturated nitrile and optionally further one or more copolymerizable monomers.

The conjugated diene may be any known conjugated diene, preferably a $C_4$-$C_6$ conjugated diene. Preferred conjugated dienes are butadiene, isoprene, piperylene, 2,3-dimethyl butadiene and mixtures thereof. Even more preferred $C_4$-$C_6$ conjugated dienes are butadiene, isoprene and mixtures thereof. The most preferred $C_4$-$C_6$ conjugated diene is butadiene.

The α,β-unsaturated nitrile may be any known α,β-unsaturated nitrile, preferably a $C_3$-$C_5$ α,β-unsaturated nitrile. Preferred $C_3$-$C_5$ α,β-unsaturated nitriles are acrylonitrile, methacrylonitrile, ethacrylonitrile and mixtures thereof. The most preferred $C_3$-$C_5$ α,β-unsaturated nitrile is acrylonitrile.

Preferably, the copolymer contains in the range of from 40 to 85 weight percent of repeating units derived from one or more conjugated dienes and in the range of from 15 to 60 weight percent of repeating units derived from one or more unsaturated nitrites. More preferably, the copolymer contains in the range of from 60 to 75 weight percent of repeating units derived from one or more conjugated dienes and in the range of from 25 to 40 weight percent of repeating units derived from one or more unsaturated nitrites. Most preferably, the copolymer contains in the range of from 60 to 70 weight percent of repeating units derived from one or more conjugated dienes and in the range of from 30 to 40 weight percent of repeating units derived from one or more unsaturated nitrites.

Optionally, the copolymer may further contain repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers will replace either the nitrile or the diene portion of the nitrile rubber and it will be apparent to the skilled in the art that the above mentioned weight percents will have to be adjusted to result in 100 weight percent. In case of the mentioned unsaturated carboxylic acids, the nitrile rubber preferably contain repeating units derived from one or more unsaturated carboxylic acids in the range of from 1 to 10 weight percent of the rubber, with this amount displacing a corresponding amount of the conjugated diolefin.

Other preferred monomers include unsaturated mono- or di-carboxylic acids or derivatives thereof (e.g., esters, amides and the like) including mixtures thereof.

The HNBR of the invention is readily available in a two step synthesis, which may take place in the same reaction set-up or different reactors.

The metathesis reaction is conducted in the presence of one or more compounds of the general formulas I, II, III or IV;

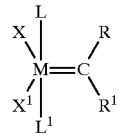

Formula I wherein:
M is Os or Ru,
R and $R^1$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
X and $X^1$ are independently any anionic ligand, and L and $L^1$ are independently any neutral ligand, such as phosphines, amines, thioethers or imidazolidines or any neutral carbine, optionally, L and $L^1$ can be linked to one another to from a bidentate neutral ligand;

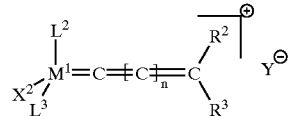

Formula II wherein
$M^1$ is Os or Ru;
$R^2$ and R3 are, independently, hydrogen or a hydrocarbon selected from the group consisting of $C_2$-$C_{20}$ alkenyl, $C_2$-$C_{20}$ alkynyl, $C_1$-$C_{20}$alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
$X^2$ is a anionic ligand, and
$L^2$ is a neutral π-bonded ligand, independent of whether they are mono- or polycyclic, L³ is a ligand selected from the group consisting of phosphines, sulfonated phosphines, fluorinated phosphines, functionalized phosphines bearing up to three aminoalkyl-, ammonumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines, Y—is a non-coordinating anion, n is an integer in the range of from 0 to 5;

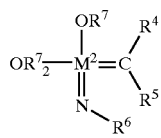

Formula III wherein

M² is Mo or W,

R⁴ and R⁵ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl, R⁶ and R⁷ are independently selected from any unsubstituted or halo-substituted alkyl, aryl, aralkyl groups or silicon-containing analogs thereof,

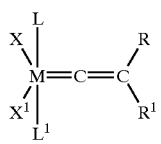

Formula IV wherein

M is Os or Ru,

R and R¹ are independently selected from the group consisting of hydrogen, substituted or unsubstituted alkyl, and substituted or unsubstituted alkyl, X and X¹ are independently any anionic ligand, and L and L¹ are independently any neutral ligand, such as phosphines, amines, thioethers or imidazolidines or any neutral carbine, optionally, L and L¹ can be linked to one another to from a bidentate neutral ligand;

Compounds of Formula I are preferred. Compounds of Formula I wherein L and L¹ are trialkylphosphines, X and X1 are chloride ions and M is Ruthenium are more preferred.

The amount of compound will depend upon the nature and catalytic activity of the compound(s) in question. Typically, the ratio of compound(s)to NBR is in the range of from 0.005 to 5, preferably in the range of from 0.025 to 1 and, more preferably, in the range of from 0.1 to 0.5.

The metathesis reaction is carried out in the presence of a co-olefin, which is preferably a $C_2$ to $C_{16}$ linear or branched olefin such as ethylene, isobutene, styrene or 1-hexene. Where the co-olefin is a liquid (such as 1-hexene), the amount of co-olefin employed is preferably in the range of from 1 to 200 weight %. Where the co-olefin is a gas (such as ethylene) the amount of co-olefin employed is such that it results in a pressure in the reaction vessel in the range of from 1×105 Pa to 1×107 Pa, preferably in the range of from 5.2×05 Pa to 4×106 Pa.

The metathesis reaction can be carried out in any suitable solvent, which does not inactivate the catalyst or otherwise interfere with the reaction. Preferred solvents include, but are not limited to, dichloromethane, benzene, toluene, tetrahydrofuran, cylcohexane and the like. The most preferred solvent is monochlorobenzene (MCB). In certain cases the co-olefin can itself act as a solvent (for example, 1-hexene), in which case no other solvent is necessary.

The concentration of nitrile polymer (NBR) in the reaction mixture is not critical but, should be such that the reaction is not hampered if the mixture is too viscous to be stirred efficiently, for example. Preferably, the concentration of NBR is in the range of from 1 to 20% by weight, more preferably in the range of from 6 to 15% by weight.

The metathesis reaction can carried out at a temperature in the range of from 20 to 140° C.; preferably in the range of from 60 to 120° C.

The reaction time will depend upon a number of factors, including cement concentration, amount of catalyst used and the temperature at which the reaction is performed. The metathesis is usually complete within the first two hours under typical conditions. The progress of the metathesis reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

After the metathesis reaction, the nitrile polymer must be hydrogenated to result in a partially or fully hydrogenated nitrile polymer (HNBR). Reduction of the product from the metathesis reaction can be effected using standard reduction techniques known in the art. For example, homogeneous hydrogenation catalysts known to those of skill in the art, such as Wilkinson's catalyst {(PPh₃)₃RhCl} and the like can be used.

The hydrogenation may be performed in situ i.e. in the same reaction vessel in which the metathesis step is carried out, without the need to first isolate the metathesized product. The hydrogenation catalyst is simply added to the vessel, which is then treated with hydrogen to produce the HNBR.

Grubb's catalyst, in the presence of hydrogen, is converted to a dihydride complex (PR₃)₂RuCl₂H₂, which is itself an olefin hydrogenation catalyst. Thus, in a favorable one-pot reaction, Grubb's catalyst was used to reduce the molecular weight of NBR in the presence of co-olefin. The reaction mixture was then treated with hydrogen, converting the Grubb's complex to the dihydride species, which then hydrogenated the metathesis product to produce the HNBR of the invention. The rate of hydrogenation was lower in this case than in the case where Wilkinson's catalyst was used for the hydrogenation step, but it is clear that such an approach is indeed a viable one.

Hydrogenation in this invention is preferably understood by more than 50% of the residual double bonds (RDB) present in the starting nitrile polymer being hydrogenated, preferably more than 90% of the RDB are hydrogenated, more preferably more than 95% of the RDB are hydrogenated and most preferably more than 99% of the RDB are hydrogenated.

The low Mooney HNBR, which forms an object of the invention, can be characterized by standard techniques known in the art. For example, the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The Mooney viscosity of the rubber was determined using ASTM test D1646.

The hydrogenated nitrile rubber of the present invention is well suited for the manufacture of a shaped article, such as a seal, hose, bearing pad, stator, well head seal, valve plate, cable sheathing, wheel, roller, pipe seal or footwear component.

EXAMPLES

Examples 1-4

Bis(tricyclohexylphosphine)benzylidene ruthenium dichloride (Grubb's metathesis catalyst), 1-hexene and monochlorobenzene (MCB) were purchased from Alfa, Aldrich Chemicals, and PPG respectively and used as received. Perbunan was obtained from Bayer Inc.

The metathesis reactions were carried out in a Parr high-pressure reactor under the following conditions:

| Cement Concentration | 6 or 15% by weight |
|---|---|
| Co-Olefin | Ethylene or 1-Hexene |
| Co-Olefin Concentration | see Table 1 |
| Agitator Speed | 600 rpm |
| Reactor Temperature | see Table 1 |
| Catalyst Loading | see Table 1 |
| Solvent | Monochlorobenzene |
| Substrate | statistical Butadiene-acrylonitrilecopolymer with a acrylonitrile content of 34 mol % and a Mooney-Viscosity ML (1 + 4) @ 100 deg. C. of 35 |

The reactor was heated to desired temperature and 60 mL of a monochlorobenzene solution containing Grubb's catalyst was added to the reactor. The reactor was pressurized to the desired ethylene pressure for Examples 1-3 or to 100 psi of Nitrogen for Example 4. The temperature was maintained constant for the duration of the reaction. A cooling coil connected to a temperature controller and a thermal sensor was used to regulate the temperature. The progress of the reaction was monitored using solution viscosity measurements for the 6% cements. At higher cement concentration, the reaction was assumed to be complete after 18 hours.

The hydrogenation reactions were carried out in the same reactor as the metathesis under the following conditions:

| Cement solid concentration | 12% |
|---|---|
| H2 (g) pressure | 1200 psi |
| Agitator Speed | 600 rpm |
| Reactor Temperature | 138° C. |
| Catalyst Loading (Wilkinson's) | 0.08 phr |
| Triphenylphosphine | 1 phr |
| Solvent | Monochlorobenzene |

The cement from the metathesis reaction was degassed 3 times with H2 (100 psi) under full agitation. The temperature of the reactor was raised to 130° C. and a 60 mL monochlorobenzene solution containing Wilkinson's catalyst and triphenylphosphine was added to the reactor. The temperature was allowed to increase to 138° C. and maintained constant for the duration of the reaction. The hydrogenation reaction was monitored by measuring the residual double bond (RDB) level at various intervals using IR spectroscopy.

Alternatively, the Ruthenium metathesis catalyst could be used to hydrogenate the polymer.

Example 1

Details 200 g of rubber was dissolved in 1133 g of MCB (15 wt.-% solid). The cement was then charged to the reactor and degassed 3 times with $C_2H_4$ (6.9×105 Pa) under full agitation.

Example 2

Details 200 g of rubber was dissolved in 1133 g of MCB (15 wt.-% solid). The cement was then charged to the reactor and degassed 3 times with $C_2H_4$ (6.9×105 Pa) under full agitation.

Example 3

Details 75 g of rubber was dissolved in 1175 g of MCB (6 wt.-% solid). The cement was then charged to the reactor and degassed 3 times with $C_2H_4$ (6.9×105 Pa) under full agitation.

Example 4

Details 75 g of rubber was dissolved in 1175 g of MCB (6 wt.-% solid). The cement was then charged to the reactor. 150 g of 1-hexene was added to the reactor and the mixture was degassed 3 times with dry N2 under full agitation.

TABLE 1

Experimental Details

| | Example 1 | Example 2 | Example 3 | Example 4 |
|---|---|---|---|---|
| Cement Concentration | 15% | 15% | 6% | 6% |
| Co-olefin | $C_2H_4$ | $C_2H_4$ | $C_2H_4$ | 1-hexene |
| Co-olefin Concentration | 500 psi | 500 psi | 500 psi | 150 g |
| Reactor Temperature | 80° C. | 80° C. | 80° C. | 80° C. |
| Catalyst Load | 0.05 phr | 0.10 phr | 0.25 phr | 0.25 phr |

For a typical product the Mn is 27 kg/mol (compared to 85 kg/mol for the starting polymer) while the Mw is 54 kg/mol (compared to 296 kg/mol for the starting polymer). As expected, the molecular weight distribution falls from 3.4 for the starting substrate feedstock to 2.0 for the metathesized product. This is consistent with a more homogeneous range of polymer chain lengths and molecular weights.

A summary of the polymer properties for selected samples is shown in Table 2. The GPC results show up to a fivefold reduction in Mw and a narrowing of the polydispersity index to a minimum of 1.90.

TABLE 2

Summary of Polymer Properties:

| | MN | MW | MZ | PDI | Mooney Viscosity (ML 1 + 4 @ 100 deg C.) |
|---|---|---|---|---|---|
| Therban ® A3407 (Comp.) | 98000 | 320000 | 945000 | 3.27 | 73 |
| Substrate | 85000 | 296000 | 939000 | 3.50 | |
| Experiment 1 | 73000 | 189000 | 441000 | 2.59 | 43 |
| Experiment 2 | 60000 | 136000 | 277000 | 2.27 | 28 |
| Experiment 3 | 31000 | 59000 | 98000 | 1.90 | 3 |
| Experiment 4 | 55000 | 111000 | 1197000 | 2.02 | 31 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydrogenated nitrile rubber having repeating units derived from at least one conjugated diene, at least one α,β-unsaturated nitrile and optionally one or more additional compolymerizable monomer, wherein the hydrogenated nitrile rubber has a molecular weight (MW) in the range of from 30,000 to 250,000, a MWD (or polydispersity index) of less than 2.5 and a Mooney viscosity (ML 1+4 100 deg. C) of less than about 5.

2. A shaped article comprising a hydrogenated nitrile rubber having repeating units derived from at least one conjugated diene, at least one α,β-unsaturated nitrite and optionally one or more additional compolymerizable monomer, wherein the hydrogenated nitrite rubber has a molecular weight (MW) in the range of from 30,000 to 250,000, a Mooney viscosity (ML 1+4 @100 deg. C) in the range of from 3 to 50, and a MWD (or polydispersity index) of less than 2.5, wherein the shaped article is a seal, a hose, a bearing pad, a stator, a well head seal, a valve plate, a cable sheathing, a wheel, a roller or a pipe seal.

* * * * *